(12) United States Patent
Cheng

(10) Patent No.: US 10,649,266 B2
(45) Date of Patent: *May 12, 2020

(54) LIQUID CRYSTAL DISPLAY AND DISPLAY DEVICE

(71) Applicant: BOE TECHNOLOGY GROUP CO., LTD., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/568,060

(22) PCT Filed: May 3, 2017

(86) PCT No.: PCT/CN2017/082895
§ 371 (c)(1),
(2) Date: Oct. 20, 2017

(87) PCT Pub. No.: WO2017/201976
PCT Pub. Date: Dec. 28, 2017

(65) Prior Publication Data
US 2018/0217420 A1    Aug. 2, 2018

(30) Foreign Application Priority Data
Jun. 24, 2016    (CN) .......................... 2016 1 0473476

(51) Int. Cl.
*G02F 1/1334*    (2006.01)
*G02F 1/1343*    (2006.01)
(Continued)

(52) U.S. Cl.
CPC ............ *G02F 1/1334* (2013.01); *G02F 1/137* (2013.01); *G02F 1/1343* (2013.01);
(Continued)

(58) Field of Classification Search
CPC ................. G02F 1/1334; G02F 1/1343; G02F 2201/123; G02F 2201/121;
(Continued)

(56) References Cited

U.S. PATENT DOCUMENTS 6,177,972 B1    1/2001    Held et al.
6,211,933 B1 *  4/2001    Mizunuma ........ G02F 1/133536
                                                      349/113
(Continued)

FOREIGN PATENT DOCUMENTS

CN    1641425 A    7/2005
CN    1670595 A    9/2005
(Continued)

OTHER PUBLICATIONS

Search Report for International Application No. PCT/CN2017/082895 dated Jul. 27, 2017.
(Continued)

*Primary Examiner* — Jia X Pan
(74) *Attorney, Agent, or Firm* — Calfee, Halter & Griswold LLP

(57) ABSTRACT

A liquid crystal display and a display device, when the liquid crystal display is powered on, a pixel electrode and a common electrode form an electric field, and liquid crystal molecules are deflected under the action of the electric field. However, due to network of the polymer, the liquid crystal polymer is in a scattering state which destroys the condition of total reflection of light from a backlight between two substrates, in such a manner that at least part of light from the backlight is scattered by the liquid crystal polymer and then is emitted from one side of a first substrate. When the liquid crystal display is in an off-state, a long-axis direction of the liquid crystal molecules in the liquid crystal polymer is the same as an extending direction of a long-chain in the
(Continued)

liquid crystal polymer, and the liquid crystal polymer is in a transparent state.

11 Claims, 4 Drawing Sheets

(51) Int. Cl.
- *G02F 1/13357* (2006.01)
- *G02F 1/1333* (2006.01)
- *G02F 1/137* (2006.01)

(52) U.S. Cl.
CPC .. *G02F 1/133345* (2013.01); *G02F 1/133615* (2013.01); *G02F 1/134309* (2013.01); *G02F 2001/13345* (2013.01); *G02F 2001/13347* (2013.01); *G02F 2001/13706* (2013.01); *G02F 2001/13712* (2013.01); *G02F 2001/134381* (2013.01); *G02F 2201/121* (2013.01); *G02F 2201/123* (2013.01)

(58) Field of Classification Search
CPC ........ G02F 2001/133342; G02F 2001/134381; G02F 1/134363; G02F 2001/134372; H01L 27/3267; G06F 3/1423
See application file for complete search history.

(56) References Cited

U.S. PATENT DOCUMENTS

| | | | |
|---|---|---|---|
| 9,366,898 B2 | 6/2016 | Guo et al. | |
| 2009/0237606 A1* | 9/2009 | Higano | G02F 1/134363 349/139 |
| 2011/0304787 A1* | 12/2011 | Wang | G02F 1/134309 349/33 |
| 2013/0050603 A1* | 2/2013 | Ise | G02F 1/134363 349/43 |
| 2013/0128165 A1 | 5/2013 | Lee et al. | |
| 2013/0242234 A1* | 9/2013 | Guo | C08F 2/48 349/88 |
| 2014/0293187 A1* | 10/2014 | Nam | G02F 1/13362 349/62 |
| 2016/0154259 A1* | 6/2016 | Kim | G02F 1/137 257/40 |
| 2016/0363794 A1 | 12/2016 | Zhou et al. | |
| 2017/0212390 A1* | 7/2017 | Miyake | C08G 73/10 |
| 2017/0261809 A1* | 9/2017 | Mizuno | G02F 1/133553 |

FOREIGN PATENT DOCUMENTS

| | | |
|---|---|---|
| CN | 1971349 A | 5/2007 |
| CN | 102629013 A | 8/2012 |
| CN | 202563217 U | 11/2012 |
| CN | 102944958 A | 2/2013 |
| CN | 103109230 A | 5/2013 |
| CN | 104317093 A | 1/2015 |
| CN | 104777682 A | 7/2015 |
| CN | 105652505 A | 6/2016 |
| CN | 105938280 A | 9/2016 |
| CN | 105954913 A | 9/2016 |
| CN | 205899207 U | 1/2017 |
| EP | 2598943 A1 | 6/2013 |
| EP | 2755076 A1 | 7/2014 |
| WO | 2012012391 A1 | 2/2012 |

OTHER PUBLICATIONS

First Office Action for Chinese Patent Application No. 201610473476.6 dated Aug. 28, 2018.
Third Office Action for Chinese Patent Application No. CN201610473476.6 dated Sep. 27, 2019.
Decision of Rejection for Chinese Patent Application No. 201610473476.6 dated Feb. 3, 2020.

* cited by examiner

LIQUID CRYSTAL DISPLAY AND DISPLAY DEVICE

CROSS REFERENCE

The present application is based on International application Ser. No. PCT/CN2017/082895, filed on May 3, 2017, which is based upon and claims priority to Chinese Patent Application No. 201610473476.6 filed on Jun. 24, 2016, titled "LIQUID CRYSTAL DISPLAY AND DISPLAY DEVICE", and the entire contents thereof are incorporated herein by reference.

TECHNICAL FIELD

The present disclosure relates to the field of display technology, and more particularly, to a liquid crystal display and a display device.

BACKGROUND

A liquid crystal display generally includes an upper substrate and a lower substrate; a liquid crystal layer located between the upper substrate and the lower substrate; a pixel electrode and a common electrode for producing an electric field on both sides of the liquid crystal layer; an upper polarizer positioned on an outer side of the upper substrate, a lower polarizer on an outer side of the lower substrate; and a backlight.

With the development of display technology, transparent displays based on the liquid crystal display attract more and more attention from people, especially, the transparent displays are widely used in places such as shop windows, buildings, vehicles. However, the conventional transparent liquid crystal displays have the problem of low transmittance.

SUMMARY

Embodiments of the present disclosure provide a liquid crystal display and a display device to improve transmittance of the liquid crystal display.

The embodiments of the present disclosure provide a liquid crystal display including: a first substrate and a second substrate disposed oppositely; a liquid crystal polymer located between the first substrate and the second substrate; a pixel electrode and a common electrode located between the first substrate and the second substrate and insulated from each other; and a side backlight configured to provide a light source, wherein the liquid crystal polymer is formed by irradiation of a mixture of a liquid crystal, a polymerizable liquid crystal monomer and a photoinitiator under ultraviolet light;

when the liquid crystal display is in an off-state, a long-axis direction of liquid crystal molecules in the liquid crystal polymer coincides with an extending direction of a long-chain in the liquid crystal polymer; and when the liquid crystal display is energized, the pixel electrode and the common electrode form an electric field, and the liquid crystal polymer is in a scattering state under the action of the electric field so that at least part of light in the backlight is scattered by the liquid crystal polymer and emitted from one side of the first substrate.

In one embodiment, in the liquid crystal polymer, a mass content of the polymerizable liquid crystal monomer is between 1% and 5%, and a mass content of the photoinitiator is between 0.5% and 3%.

In one embodiment, in the above-described liquid crystal display provided by the embodiments of the present disclosure, the pixel electrode and the common electrode are located on both sides of the liquid crystal polymer, respectively;

when the liquid crystal in the liquid crystal polymer is a positive liquid crystal, and the liquid crystal display is in the off-state, the long-axis direction of the liquid crystal molecules in the liquid crystal polymer is perpendicular to a cell gap direction of the liquid crystal display; or when the liquid crystal in the liquid crystal polymer is a negative liquid crystal, and the liquid crystal display is in the off-state, the long-axis direction of the liquid crystal molecules in the liquid crystal polymer is parallel to the cell gap direction of the liquid crystal display.

In one embodiment, in the above-described liquid crystal display provided by the embodiments of the present disclosure, the pixel electrode and the common electrode are both located on the same side of the liquid crystal polymer;

when the liquid crystal in the liquid crystal polymer is a positive liquid crystal, and the liquid crystal display is in the off-state, the long-axis direction of the liquid crystal molecules in the liquid crystal polymer is parallel to a cell gap direction of the liquid crystal display; or when the liquid crystal in the liquid crystal polymer is a negative liquid crystal, and the liquid crystal display is in the off-state, the long-axis direction of the liquid crystal molecules in the liquid crystal polymer is perpendicular to the cell gap direction of the liquid crystal display.

In one embodiment, in the above-described liquid crystal display provided by the embodiments of the present disclosure, the pixel electrode and the common electrode are alternately disposed in the same layer.

In one embodiment, in the above-described liquid crystal display provided by the embodiments of the present disclosure, the pixel electrode and the common electrode are disposed in different layers; and the liquid crystal display further includes an insulating layer between the pixel electrode and the common electrode.

In one embodiment, in the above-described liquid crystal display provided by the embodiments of the present disclosure, the pixel electrode and the common electrode are located on one side of the second substrate facing the liquid crystal polymer.

In one embodiment, in the above-described liquid crystal display provided by the embodiments of the present disclosure, the pixel electrode is located between the insulating layer and the second substrate, and the common electrode is located between the insulating layer and the liquid crystal polymer; or the common electrode is located between the insulating layer and the second substrate, and the pixel electrode is located between the insulating layer and the liquid crystal polymer.

In one embodiment, in the above-described liquid crystal display provided by the embodiments of the present disclosure, the pixel electrode and the common electrode are located on one side of the first substrate facing the liquid crystal polymer.

In one embodiment, in the above-described liquid crystal display provided by the embodiments of the present disclosure, the pixel electrode is located between the insulating layer and the first substrate, and the common electrode is located between the insulating layer and the liquid crystal polymer; or the common electrode is located between the insulating layer and the first substrate, and the pixel electrode is located between the insulating layer and the liquid crystal polymer.

In one embodiment, in the above-described liquid crystal display provided by the embodiments of the present disclosure, the liquid crystal display further includes: an auxiliary electrode located between the first substrate and the second substrate, wherein the auxiliary electrode and the pixel electrode are located on both sides of the liquid crystal polymer, respectively.

Correspondingly, the embodiments of the present disclosure further provide a display device including any of the above-described liquid crystal displays provided by the embodiments of the present disclosure.

DETAILED DESCRIPTION

Figure 1:
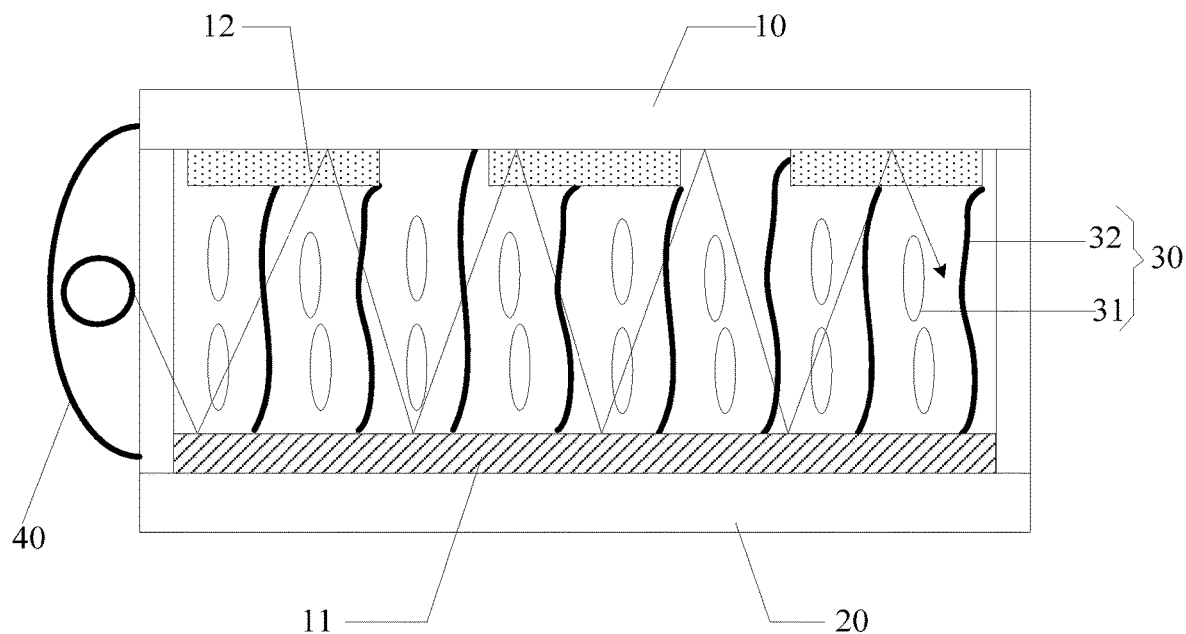
FIG. 1 is a structural schematic diagram of a liquid crystal display provided by the present disclosure.

To make purposes, technical solutions and advantages of the present disclosure clearer, hereinafter, the specific implementing manners of a liquid crystal display and a display device provided by embodiments of the present disclosure will be described in detail in conjunction with the accompanying drawings.

The shape and size of components in the accompanying drawings do not reflect the true scale of the liquid crystal display, the purpose of which is merely illustrative of the contents of the present disclosure.

The embodiments of the present disclosure provide a liquid crystal display. As shown in FIGS. 1 to 6, the liquid crystal display includes a first substrate 10 and a second substrate 20 disposed oppositely; a liquid crystal polymer 30 positioned between the first substrate 10 and the second substrate 20; a pixel electrode 11 and a common electrode 12 positioned between the first substrate 10 and the second substrate 20 and insulated from each other; and a side backlight 40 configured to provide a light source, wherein the liquid crystal polymer 30 is formed by irradiation of a mixture of a liquid crystal, a polymerizable liquid crystal monomer, and a photoinitiator under ultraviolet light;

when the liquid crystal display is in an off-state, a direction of a long-axis of a liquid crystal molecules 31 in the liquid crystal polymer 30 is the same as an extending direction of a long-chain 32 in the liquid crystal polymer 30; and when the liquid crystal display is powered on, the pixel electrode 11 and the common electrode 12 form an electric field, and the liquid crystal polymer 30 is in a scattering state under the action of the electric field, such that at least a portion of light from the backlight 40 is scattered by the liquid crystal polymer 30 and then is emitted from one side of the first substrate 10.

In the above-described liquid crystal display provided by the embodiments of the present disclosure, the liquid crystal polymer is formed by irradiating the mixture of the liquid crystal, the polymerizable liquid crystal monomer and the photoinitiator with the ultraviolet light, after the mixture is irradiated under the ultraviolet light, polymerization of the polymerizable liquid crystal monomer may occur, the direction of the long-chain of the polymer is substantively the same as the direction of the long-axis of the liquid crystal molecules. Therefore, when the above-mentioned liquid crystal display is powered on, the pixel electrode and the common electrode form the electric field, the liquid crystal molecules in the liquid crystal polymer are deflected under the action of the electric field, however, due to the action of the polymer network, the liquid crystal polymer is in the scattering state, and the scattering state destroys the condition of light from the backlight totally reflecting between the two substrates, in such a manner that at least part of light from the backlight is scattered by the liquid crystal polymer and then is emitted from one side of the first substrate. When the liquid crystal display is in the off-state, the direction of the long-axis of the liquid crystal molecules in the liquid crystal polymer is the same as the extending direction of the long-chain in the liquid crystal polymer, and the liquid crystal polymer is in a transparent state. Therefore, in the above-described liquid crystal display, by the action of the electric field which is on-state or off-state, the liquid crystal molecules may be rotated or reset, and liquid crystal display may be realized. When the liquid crystal display is in the off-state, as compared to the conventional liquid crystal display, two polarizers are saved in the liquid crystal display provided by the embodiments of the present disclosure, transmission may reach 90%. In this way, when the liquid crystal display is applied to a transparent display, high transparency will be obtained.

In specific implementation, in the above-described liquid crystal display provided by the embodiments of the present disclosure, in the mixture of the liquid crystal, the polymerizable liquid crystal monomer and the photoinitiator, a content of the polymerizable liquid crystal monomer is generally controlled between 1% to 5%, and a content of the photoinitiator is generally controlled between 0.5% to 3%.

In specific implementation, the liquid crystal is classified into a positive liquid crystal and a negative liquid crystal, when electron withdrawing groups are located at ends of the long-axis of the liquid crystal molecules, the dielectric constant $\Delta\varepsilon$ is greater than 0, and the liquid crystal is positive; and when the electron withdrawing groups are located in a direction of a short-axis of the liquid crystal molecules, the dielectric constant $\Delta\varepsilon$ is less than 0, and the liquid crystal is negative. Under the action of the electric field, the positive and negative liquid crystals are affected by the electric field and thus rotated. When the positive liquid crystal molecules are under the action of the electric field, the direction of the long-axis of the liquid crystal molecules is arranged in a tangential direction of the electric field; differently, and the direction of the short axis of the negative liquid crystal molecules is arranged in a direction of the electric field.

Therefore, in specific implementation, in the above-mentioned crystal liquid display provided by the embodiments of the present disclosure, as shown in FIG. 1, the pixel electrode 11 and the common electrode 12 are respectively located on both sides of the liquid crystal polymer, and when the liquid crystal display is powered on, the pixel electrode and the common electrode mainly form a vertical electric field.

When the liquid crystal in the liquid crystal polymer 30 is a negative liquid crystal, and the liquid crystal display is in the off-state, the direction of the long-axis of the liquid crystal molecules 31 in the liquid crystal polymer 30 is parallel to a cell gap direction of the liquid crystal display; and when the liquid crystal display is powered on, the direction of the long-axis of the liquid crystal molecules 31 in the liquid crystal polymer 30 is deflected under the action of the vertical electric field in a direction perpendicular to the cell gap direction.

When the liquid crystal in the liquid crystal polymer is a positive liquid crystal, and the liquid crystal display is in the off-state, the direction of the long-axis of the liquid crystal molecules in the liquid crystal polymer is perpendicular to the cell gap direction of the liquid crystal display; and when the liquid crystal display is powered on, the direction of the long-axis of the liquid crystal molecules in the liquid crystal polymer is deflected under the action of the vertical electric field in the cell gap direction.

Alternately, in specific implementation, in the above-mentioned liquid crystal display provided by the embodiments of the present disclosure, as shown in FIGS. 2 to 8, both the pixel electrode 11 and the common electrode 12 are located on the same side of the liquid crystal polymer 30; and when the liquid crystal display is powered on, the pixel electrode 11 and the common electrode 12 mainly form a horizontal electric field.

When the liquid crystal in the liquid crystal polymer 30 is a positive liquid crystal, and the liquid crystal display is in the off-state, the direction of the long-axis of the liquid crystal molecules 31 in the liquid crystal polymer 30 is parallel to the cell gap direction of the liquid crystal display; and when the liquid crystal display is powered on, the direction of the long-axis of the liquid crystal molecules 31 in the liquid crystal polymer 30 is deflected under the action of the horizontal electric field in a direction perpendicular to the cell gap direction.

When the liquid crystal in the liquid crystal polymer is a negative liquid crystal, and the liquid crystal display is in the off-state, the direction of the long-axis of the liquid crystal molecules in the liquid crystal polymer is perpendicular to the cell gap direction of the liquid crystal display; and when the liquid crystal display is powered on, the direction of the long-axis of the liquid crystal molecules in the liquid crystal polymer is deflected under the action of the horizontal electric field in the cell gap direction.

FIG. 1 is illustrated by taking a negative liquid crystal for an example, and the remaining drawings are illustrated by taking a positive liquid crystal as an example.

Further, in specific implementation, in the above-described liquid crystal display provided in the embodiments of the present disclosure, when the liquid crystal display is in the off-state, the long-axis direction of the liquid crystal molecules in the liquid crystal polymer is perpendicular to the cell gap direction of the liquid crystal display. Generally, it is required to use a vertical alignment material to carry out a vertical alignment treatment on the substrate. When the liquid crystal display is in the off-state, the long-axis direction of the liquid crystal molecules in the liquid crystal polymer is in the cell gap direction of the liquid crystal display, and a horizontal alignment material is generally used to perform a horizontal alignment treatment on the substrate.

It is to be noted that in the above-mentioned liquid crystal display provided by the embodiments of the present disclosure, those skilled in the art commonly know that the long-axis direction of the liquid crystal molecules in the liquid crystal polymer is the same as the extending direction of the long-chain in the liquid crystal polymer, it means that they are substantively the same, not totally the same in the strict sense. Similarly, the long-axis direction of the liquid crystal molecules is parallel to or perpendicular to the cell gap direction of the liquid crystal display, it also means that they are approximately parallel to or perpendicular to each other, not completely parallel to or perpendicular to each other.

Figure 7:
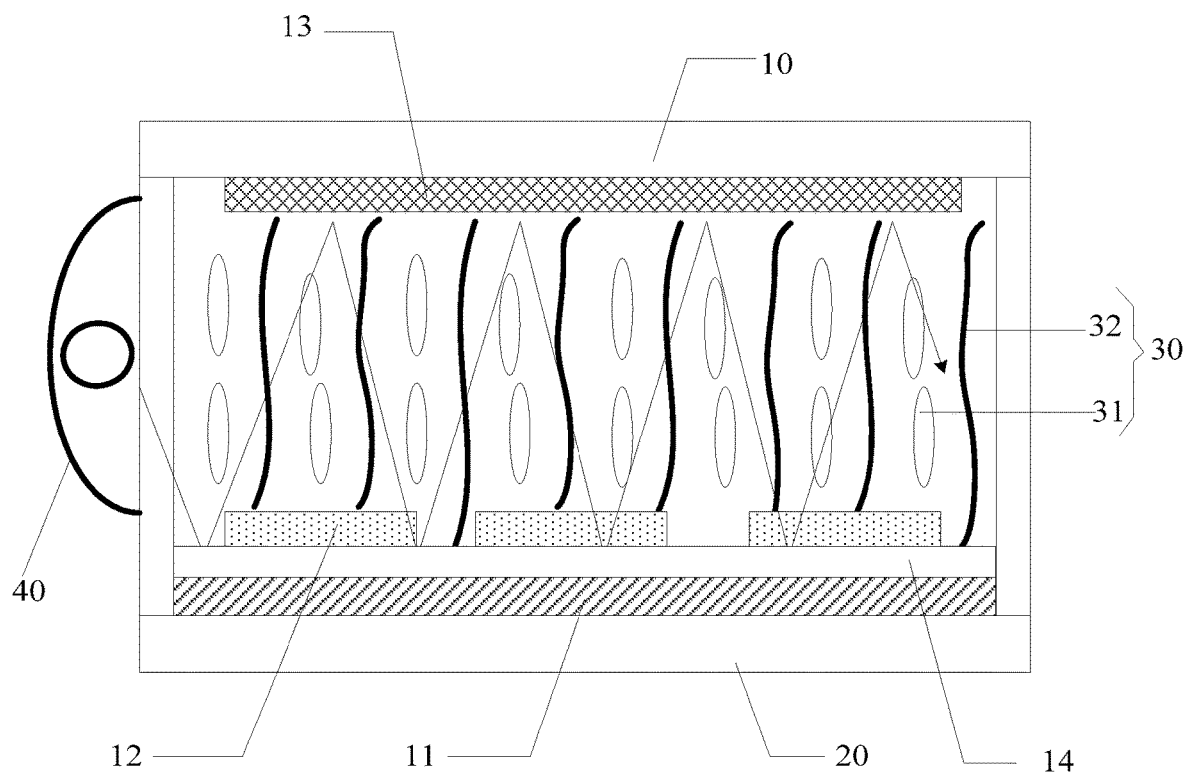
FIG. 7 is a structural schematic diagram of a liquid crystal display provided by the present disclosure.
Figure 8:
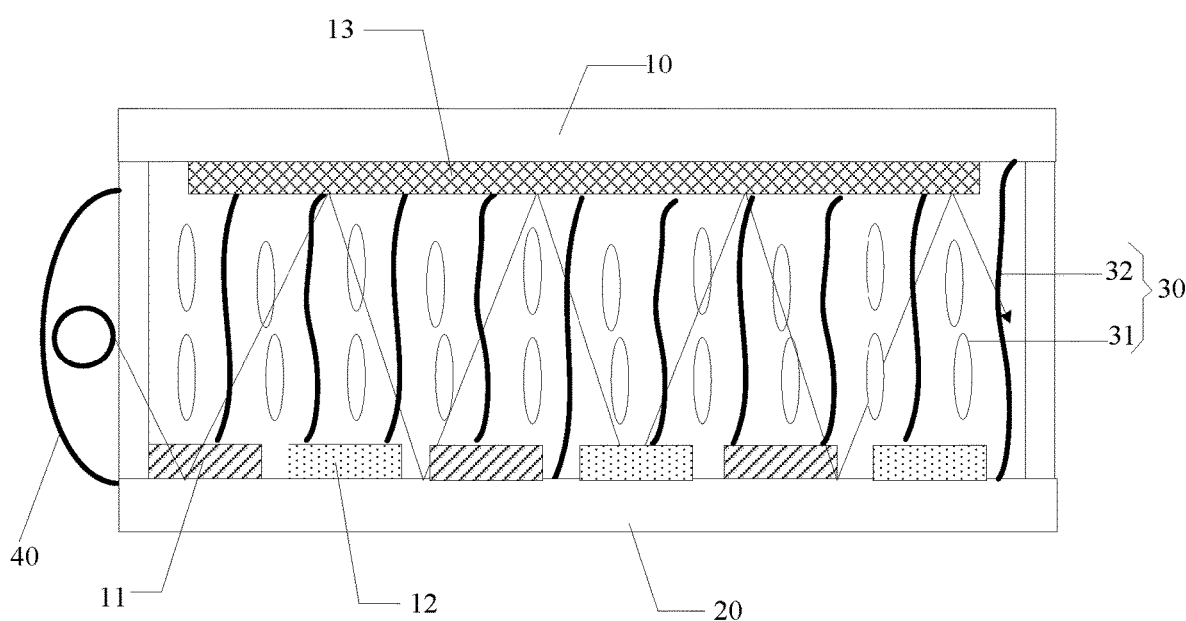
FIG. 8 is a structural schematic diagram of a liquid crystal display provided by the present disclosure.

In one embodiment, as shown in FIGS. 7 and 8, when the pixel electrode 11 and the common electrode 12 are located on the same side of the liquid crystal polymer 30, the above-mentioned liquid crystal display provided by the embodiments of the present disclosure further includes an auxiliary electrode 13 positioned between the first substrate 10 and the second substrate 20, and the auxiliary electrode 13 and the pixel electrode 11 are respectively located on both sides of the liquid crystal polymer. The auxiliary electrode is configured to adjust the electric field formed by the pixel electrode and the common electrode so that the electric field has more horizontal components, that is, the auxiliary electrode is configured to increase the horizontal component of the electric field formed by the pixel electrode and the common electrode.

It is to be noted that in the above-mentioned liquid crystal display provided by the embodiments of the present disclosure, generally, one pixel unit corresponds to one pixel electrode, and one liquid crystal display corresponds to one auxiliary electrode.

Hereinafter, the specific positions of the common electrode and the pixel electrode when the common electrode and the pixel electrode are located on the same side of the liquid crystal polymer will be described in detail.

First Embodiment

Figure 2:
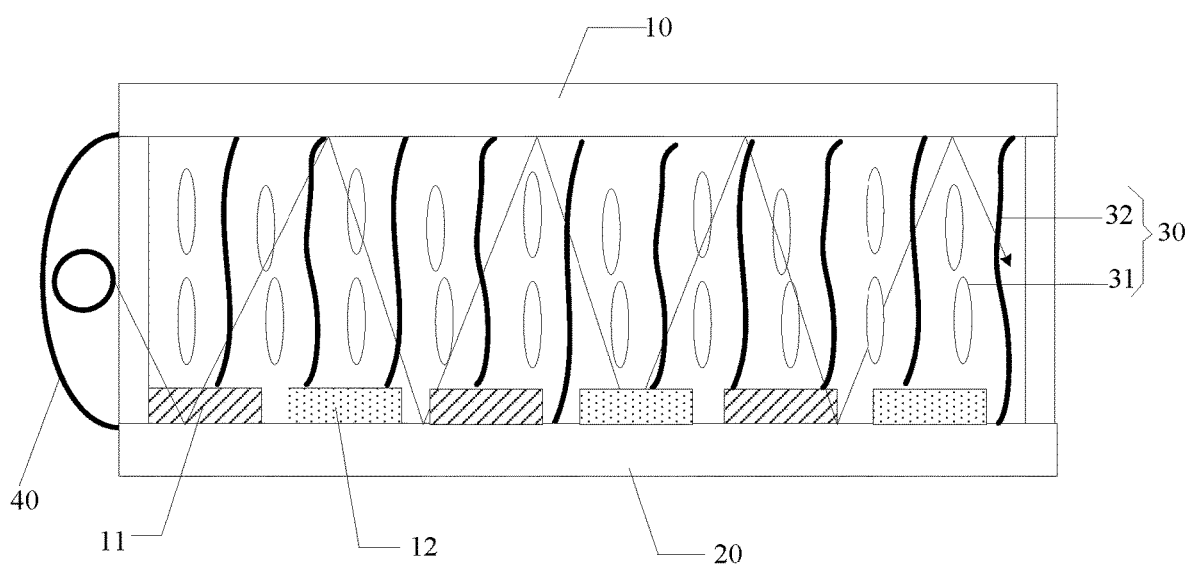
FIG. 2 is a structural schematic diagram of a liquid crystal display provided by the present disclosure.

As shown in FIG. 2, in the above-described liquid crystal display provided by the embodiments of the present disclosure, the pixel electrode 11 and the common electrode 12 are alternately disposed in the same layer.

Further, as shown in FIG. 2, the pixel electrode 11 and the common electrode 12 may be located on one side of the second substrate facing the liquid crystal polymer 30. The pixel electrode and the common electrode may also be located on one side of the first substrate facing the liquid crystal polymer, the present disclosure does not impose limitation on this.

However, when the liquid crystal display is powered on, the light from the backlight is emitted from one side of the first substrate, i.e., the one side of the first substrate is a light exiting side of the liquid crystal display, therefore, a thin film transistor in the liquid crystal display is generally disposed on the first substrate. In one embodiment, the pixel electrode and the common electrode are located on one side of the second substrate facing the liquid crystal polymer, in this way, it is convenient to realize the connection of the thin film transistor with the pixel electrode in terms of processes.

Further, in specific implementation, both the pixel electrode and the common electrode are strip-shaped electrodes, and it is not limited thereto.

Second Embodiment

Figure 3:
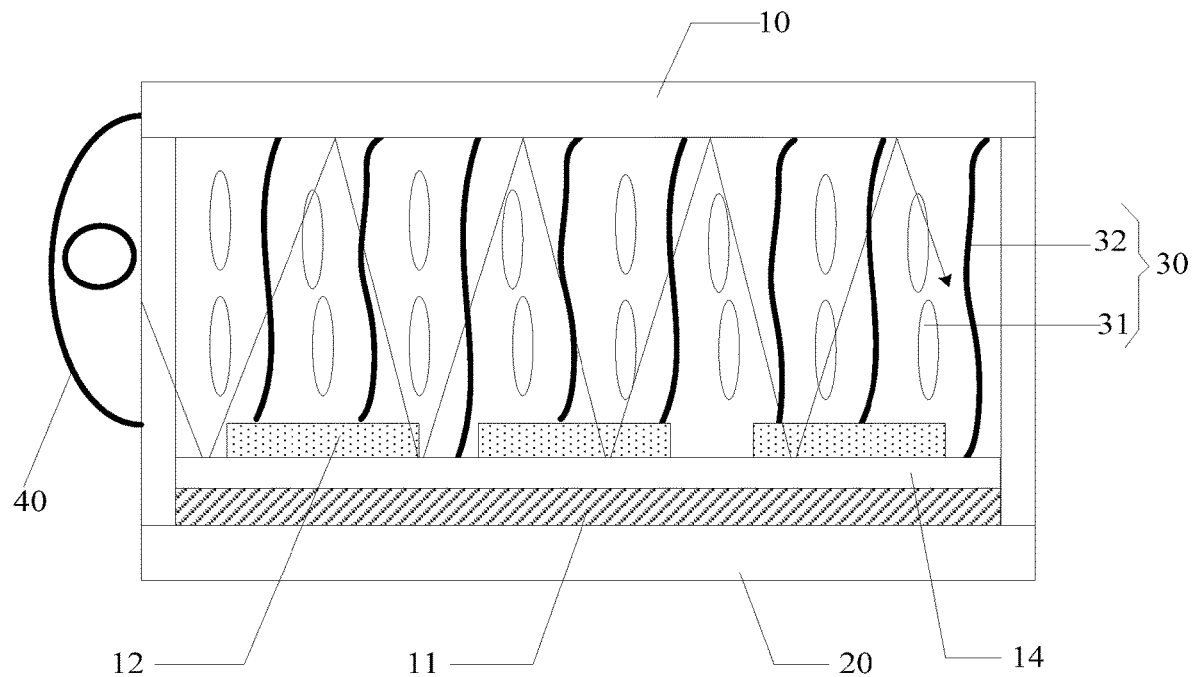
FIG. 3 is a structural schematic diagram of a liquid crystal display provided by the present disclosure.
Figure 4:
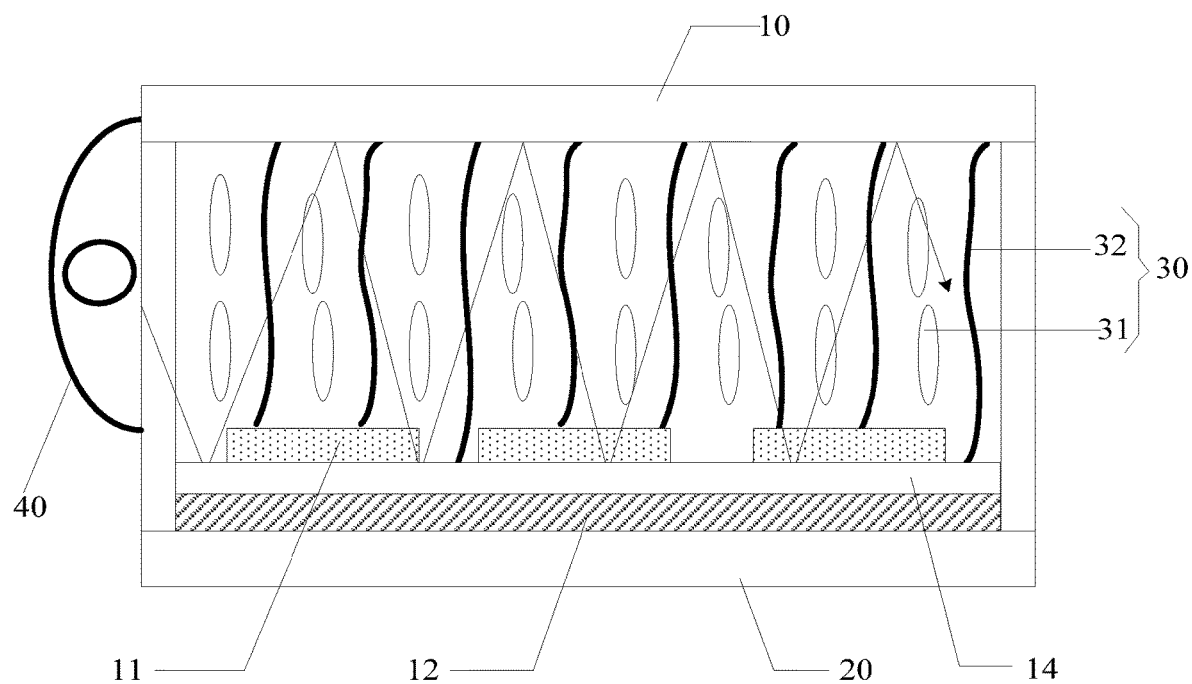
FIG. 4 is a structural schematic diagram of a liquid crystal display provided by the present disclosure.

As shown in FIGS. 3 and 4, in the above-described liquid crystal display provided by the embodiments of the present disclosure, the pixel electrode 11 and the common electrode 12 are disposed in different layers.

The liquid crystal display further includes an insulating layer 14 between the pixel electrode 11 and the common electrode 12.

In specific implementation, as shown in FIGS. 3 and 4, the pixel electrode 11 and the common electrode 12 may be located on one side of the second substrate 20 facing the liquid crystal polymer 30.

Further, in the above-described liquid crystal display provided by the embodiments of the present disclosure, as shown in FIG. 3, the pixel electrode 11 is located between the insulating layer 14 and the second substrate 20, and the common electrode 12 is located between the insulating layer 14 and the liquid crystal polymer 30.

In specific implementation, the common electrode may be a stripe-shaped electrode or a slit-like electrode, and the pixel electrode may be a planar electrode, it is not limited thereto.

Alternatively, further, in the above-described liquid crystal display provided by the embodiments of the present disclosure, as shown in FIG. 4, the common electrode 12 is located between the insulating layer 14 and the second substrate 20, and the pixel electrode 11 is located between the insulating layer 14 and the liquid crystal polymer 30.

In specific implementation, the pixel electrode may be a stripe-shaped electrode or a slit-like electrode, and the common electrode may be a planar electrode, it is not limited thereto.

Third Embodiment

Figure 5:
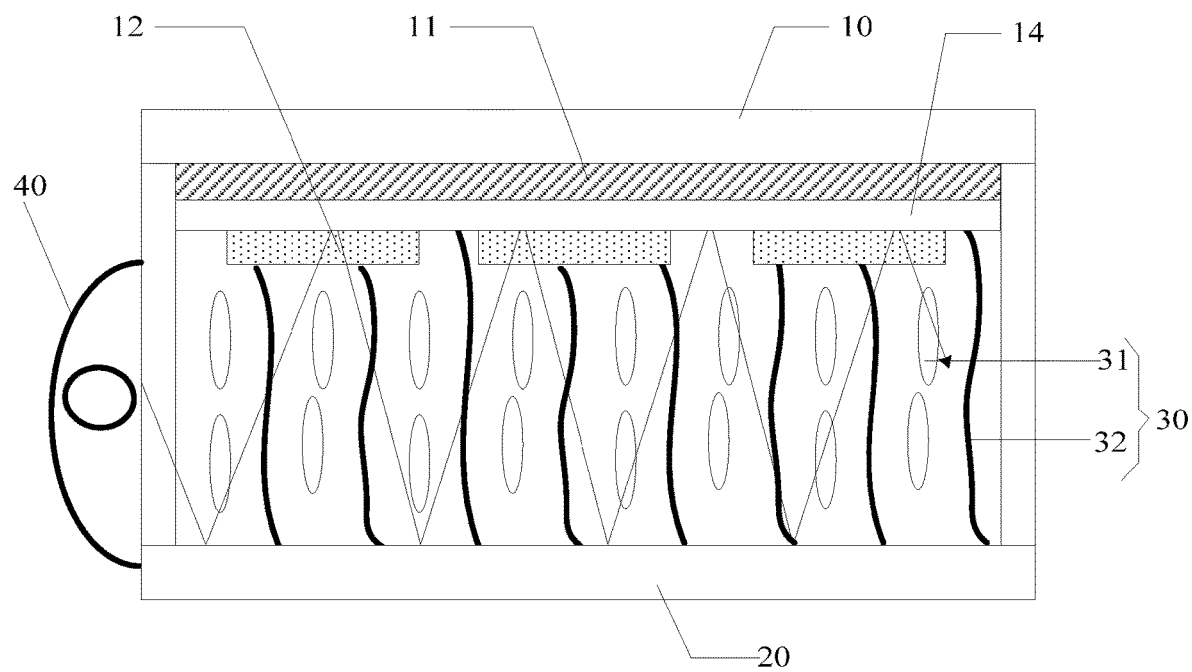
FIG. 5 is a structural schematic diagram of a liquid crystal display provided by the present disclosure.
Figure 6:
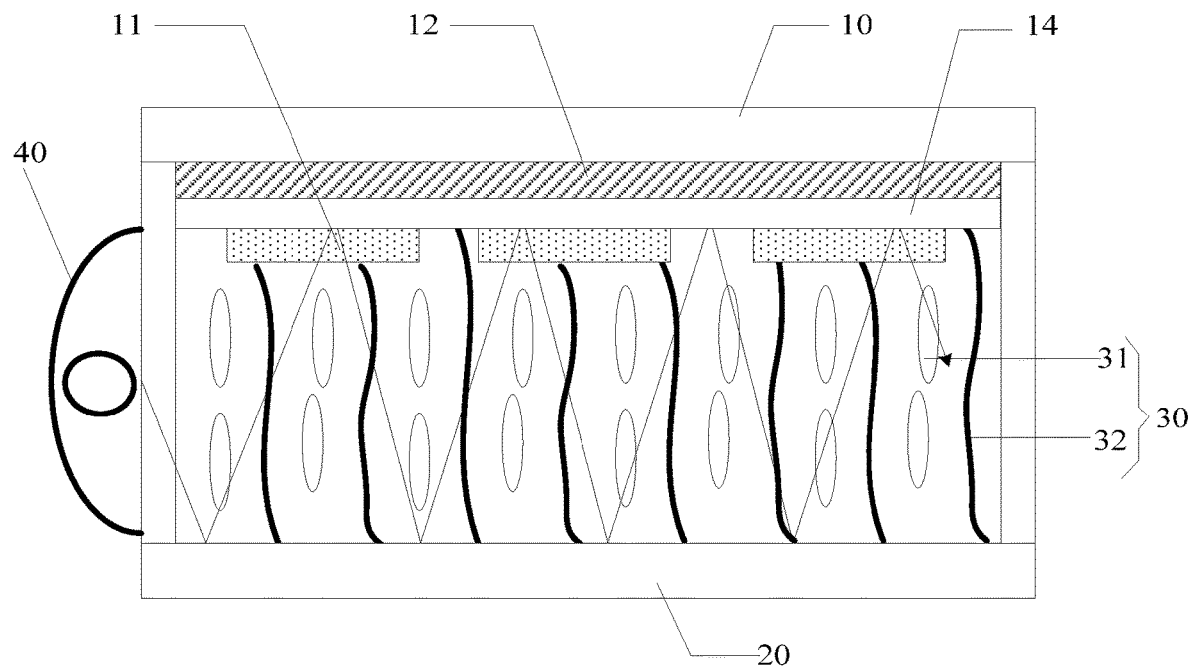
FIG. 6 is a structural schematic diagram of a liquid crystal display provided by the present disclosure.

As shown in FIGS. 5 and 6, in the above-described liquid crystal display provided by the embodiments of the present disclosure, the pixel electrode 11 and the common electrode 12 are disposed in different layers.

The liquid crystal display further includes an insulating layer 14 between the pixel electrode 11 and the common electrode 12.

In specific implementation, as shown in FIGS. 5 and 6, the pixel electrode 11 and the common electrode 12 may be located on one side of the first substrate 10 facing the liquid crystal polymer 30.

Further, in the above-described liquid crystal display provided by the embodiments of the present disclosure, as shown in FIG. 5, the pixel electrode 11 is located between the insulating layer 14 and the first substrate 10, and the common electrode 12 is located between the insulating layer 14 and the liquid crystal polymer 30.

In specific implementation, the common electrode may be a stripe-shaped electrode or a slit-like electrode, and the pixel electrode may be a planar electrode, it is not limited thereto.

Alternately, further, in the above-described liquid crystal display provided by the embodiments of the present disclosure, as shown in FIG. 6, the common electrode 12 is located between the insulating layer 14 and the first substrate 10, and the pixel electrode 11 is located between the insulating layer 14 and the liquid crystal polymer 30.

In specific implementation, the pixel electrode may be a stripe-shaped electrode or a slit-like electrode, and the common electrode may be a planar electrode, it is not limited thereto.

It is further noted that the above-described liquid crystal display provided by the embodiments of the present disclosure does not include a polarizer, but include other films and structures for realizing liquid crystal display, such as thin film transistors, color films, black matrix layers, spacers, and the like. These films and structures are disposed to be the same as those in the related art and will not be described in detail herein.

Based on the same inventive concept, the embodiments of the present disclosure further provide a display device including any of the above-described liquid crystal displays provided by the embodiments of the present disclosure. Since the principle of the display device for solving the problem is similar to that of one of the above-described liquid crystal displays, the implementation of the display device may refer to the implementation of the aforementioned liquid crystal display, and the repetition will be omitted.

The embodiments of the present disclosure provide a liquid crystal display and a display device, since the liquid crystal polymer is formed by irradiating the mixture of the liquid crystal, the polymerizable liquid crystal monomer and the photoinitiator with the ultraviolet light, after the mixture is irradiated under the ultraviolet light, polymerization of the polymerizable liquid crystal monomer may occur, the direction of the long-chain of the polymer is substantively the same as the direction of the long-axis of the liquid crystal molecules. Therefore, when the above-mentioned liquid crystal display is powered on, the pixel electrode and the common electrode form the electric field, the liquid crystal molecules in the liquid crystal polymer are deflected under the action of the electric field, however, due to network of the polymer, the liquid crystal polymer is in the scattering state, and the scattering state destroys the condition of the light from the backlight totally reflecting between the two substrates, in such a manner that at least part of light from the backlight is scattered by the liquid crystal polymer and then is emitted from one side of the first substrate. When the liquid crystal display is in the off-state, the direction of the long-axis of the liquid crystal molecules in the liquid crystal polymer is the same as the extending direction of the long-chain in the liquid crystal polymer, and the liquid crystal polymer is in a transparent state. Therefore, in the above-described liquid crystal display, by the action of the electric field which is on-state and off-state, the liquid crystal molecules may be rotated or reset, and liquid crystal display may be realized. When the liquid crystal display is in the off-state, as compared to the conventional liquid crystal display, two polarizers are saved in the liquid crystal display provided by the embodiments of the present disclosure, transmission may reach 90%. In this way, when the liquid crystal display is applied to a transparent display, high transparency will be obtained.

It will be apparent to those skilled in the art that various changes and modifications can be made in the present disclosure without departing from the spirit and scope of the invention. In this manner, it is intended that the present disclosure be accompanied by such changes and modifications if the variations and modifications of the present disclosure are within the scope of the appended claims and the equivalents thereof.

What is claimed is:

1. A liquid crystal display comprising:
a first substrate and a second substrate disposed opposite to each other;
a liquid crystal polymer located between the first substrate and the second substrate;
a pixel electrode and a common electrode located between the first substrate and the second substrate and insulated from each other; the pixel electrode and the common electrode being located on a same side of the liquid crystal polymer;

an auxiliary electrode positioned between the first substrate and the second substrate, and the auxiliary electrode and the pixel electrode being respectively located on both sides of the liquid crystal polymer, the auxiliary electrode being configured to increase the horizontal component of the electric field formed by the pixel electrode and the common electrode; and a side backlight configured to provide a light source, wherein the liquid crystal polymer is formed by irradiation of a mixture of a liquid crystal, a polymerizable liquid crystal monomer and a photoinitiator under ultraviolet light;

when the liquid crystal display is in an off-state, a long-axis direction of liquid crystal molecules in the liquid crystal polymer coincides with an extending direction of a long-chain in the liquid crystal polymer, the liquid crystal polymer is in a transparent state without two polarizers; and when the liquid crystal display is powered on, the pixel electrode and the common electrode form an electric field, the liquid crystal molecules in the liquid crystal polymer are deflected under action of the electric field, however, due to network of the polymer, the liquid crystal polymer is in the scattering state, and the scattering state destroys the condition of the light from the backlight totally reflecting between the two substrates, so that at least part of light from the backlight is scattered by the liquid crystal polymer and emitted from one side of the first substrate; and when the liquid crystal in the liquid crystal polymer is a negative liquid crystal, and the liquid crystal display is in the off-state, the long-axis direction of the liquid crystal molecules in the liquid crystal polymer is perpendicular to the cell gap direction of the liquid crystal display.

2. The liquid crystal display according to claim 1, wherein in the liquid crystal polymer, a mass content of the polymerizable liquid crystal monomer is between 1% and 5%, and a mass content of the photoinitiator is between 0.5% and 3%.

3. The liquid crystal display according to claim 1, wherein the pixel electrode and the common electrode are alternately disposed in a same layer.

4. The liquid crystal display according to claim 1, wherein the pixel electrode and the common electrode are disposed in different layers; and the liquid crystal display further comprises an insulating layer between the pixel electrode and the common electrode.

5. The liquid crystal display according to claim 4, wherein the pixel electrode and the common electrode are located on one side of the second substrate facing the liquid crystal polymer.

6. The liquid crystal display according to claim 5, wherein the pixel electrode is located between the insulating layer and the second substrate, and the common electrode is located between the insulating layer and the liquid crystal polymer.

7. The liquid crystal display according to claim 4, wherein the pixel electrode and the common electrode are located on one side of the first substrate facing the liquid crystal polymer.

8. The liquid crystal display according to claim 7, wherein the pixel electrode is located between the insulating layer and the first substrate, and the common electrode is located between the insulating layer and the liquid crystal polymer.

9. The liquid crystal display according to claim 5, wherein the common electrode is located between the insulating layer and the second substrate, and the pixel electrode is located between the insulating layer and the liquid crystal polymer.

10. The liquid crystal display according to claim 7, wherein the common electrode is located between the insulating layer and the first substrate, and the pixel electrode is located between the insulating layer and the liquid crystal polymer.

11. A display device comprising the liquid crystal display according to claim 1.

* * * * *